US010535954B2

(12) United States Patent
Kia et al.

(10) Patent No.: US 10,535,954 B2
(45) Date of Patent: Jan. 14, 2020

(54) AUTOMATICALLY DEDUCING THE ELECTRICAL CABLING BETWEEN ELECTRICAL DEVICES

(71) Applicant: Eaton Industries (France) SAS, Montbonnot St Martin (FR)

(72) Inventors: Emilien Kia, Pontcharra (FR); Aurelien Begou, Saint Martin d'heres (FR)

(73) Assignee: EATON INTELLIGENT POWER LIMITED, Dublin (IE)

( * ) Notice: Subject to any disclaimer, the term of this patent is extended or adjusted under 35 U.S.C. 154(b) by 84 days.

(21) Appl. No.: 15/549,687

(22) PCT Filed: Feb. 8, 2016

(86) PCT No.: PCT/EP2016/052590
§ 371 (c)(1),
(2) Date: Aug. 9, 2017

(87) PCT Pub. No.: WO2016/128338
PCT Pub. Date: Aug. 18, 2016

(65) Prior Publication Data
US 2018/0034209 A1 Feb. 1, 2018

(30) Foreign Application Priority Data
Feb. 11, 2015 (GB) .................. 1502284.1

(51) Int. Cl.
H01R 13/641 (2006.01)
G02B 6/38 (2006.01)
(Continued)

(52) U.S. Cl.
CPC ......... H01R 13/641 (2013.01); G02B 6/4274 (2013.01); G02B 6/4298 (2013.01); H01R 13/717 (2013.01)

(58) Field of Classification Search
CPC .... H01R 13/641; H01R 13/64; G02B 6/3817; G02B 6/4274; G02B 6/4298
See application file for complete search history.

(56) References Cited

U.S. PATENT DOCUMENTS 4,671,597 A * 6/1987 Grill .................. H01R 13/7177
324/133
5,007,857 A * 4/1991 Wright ................ H01R 13/717
439/490

(Continued)

FOREIGN PATENT DOCUMENTS

CN 1183839 A 6/1998
CN 1797866 A 7/2006
(Continued)

Primary Examiner — Thomas A Hollweg
Assistant Examiner — Mary A El-Shammaa
(74) Attorney, Agent, or Firm — Leydig, Voit & Mayer, Ltd.

(57) ABSTRACT

A plug adapter configured for application with a system for automatically deducing the electrical cabling between electrical devices includes: a plug configured to plug into in a socket of an electrical device; a socket configured to plug into a plug of an electrical cable; a light receiver positioned to receive light emitted by an optical fiber ending in the plug of the electrical cable; and an electronic unit configured to control the light receiver and/or the light emitter and including an interface configured to communicate with a cabling management system of the system configured to automatically deduce the electrical cabling between electrical devices in order to receive control signals for the light emitter and to transmit detection signals from the light receiver.

10 Claims, 4 Drawing Sheets

(51) Int. Cl.
  *H01R 13/717* (2006.01)
  *G02B 6/42* (2006.01)

(56) References Cited

U.S. PATENT DOCUMENTS

| | | | |
|---|---|---|---|
| 5,033,112 A | 7/1991 | Bowling et al. | |
| 5,207,594 A * | 5/1993 | Olson | H01R 13/652 |
| | | | 340/656 |
| 5,283,429 A * | 2/1994 | Campolo | G01K 11/32 |
| | | | 250/227.14 |
| 5,394,503 A | 2/1995 | Dietz, Jr. | |
| 5,594,503 A | 1/1997 | Miyazawa | |
| 5,666,453 A | 9/1997 | Dannenmann | |
| 5,923,363 A * | 7/1999 | Elberbaum | H04B 3/548 |
| | | | 340/12.32 |
| 6,071,015 A | 6/2000 | Erbse et al. | |
| 6,603,842 B2 * | 8/2003 | Elberbaum | H04N 7/186 |
| | | | 348/14.01 |
| 6,906,505 B2 | 6/2005 | Brunet et al. | |
| 7,121,707 B2 * | 10/2006 | Currie | H01R 13/7172 |
| | | | 362/555 |
| 7,290,702 B2 * | 11/2007 | Elberbaum | G07C 9/00182 |
| | | | 235/375 |
| 7,649,727 B2 * | 1/2010 | Elberbaum | H01H 9/167 |
| | | | 361/170 |
| 8,135,274 B2 | 3/2012 | Zhang et al. | |
| 8,167,471 B1 * | 5/2012 | Moritz | G02B 6/001 |
| | | | 362/554 |
| 8,170,722 B1 * | 5/2012 | Elberbaum | H04L 12/281 |
| | | | 455/151.1 |
| 2003/0209358 A1 * | 11/2003 | Kruse | H02G 3/18 |
| | | | 174/58 |
| 2006/0046575 A1 * | 3/2006 | Allen | H01R 33/94 |
| | | | 439/638 |
| 2006/0057876 A1 * | 3/2006 | Dannenmann | G01R 31/041 |
| | | | 439/173 |
| 2008/0102689 A1 * | 5/2008 | Dhir | H01R 13/7175 |
| | | | 439/490 |
| 2008/0266063 A1 * | 10/2008 | James | H04Q 1/136 |
| | | | 340/286.02 |
| 2010/0098375 A1 | 4/2010 | Fankhauser | |
| 2011/0110673 A1 * | 5/2011 | Elberbaum | G02B 6/3817 |
| | | | 398/202 |
| 2012/0045928 A1 * | 2/2012 | Caveney | H04Q 1/138 |
| | | | 439/488 |
| 2014/0111028 A1 * | 4/2014 | Higgins | G05B 19/042 |
| | | | 307/125 |
| 2014/0142735 A1 * | 5/2014 | Partridge | G11B 20/10527 |
| | | | 700/94 |
| 2014/0219615 A1 * | 8/2014 | Petersen | G02B 6/3817 |
| | | | 385/88 |
| 2014/0313042 A1 * | 10/2014 | Scherer | H01R 13/641 |
| | | | 340/660 |

FOREIGN PATENT DOCUMENTS

| | | |
|---|---|---|
| CN | 101449189 A | 6/2009 |
| CN | 101552639 A | 10/2009 |
| EP | 1199586 A2 | 4/2002 |
| EP | 2083487 B1 | 7/2009 |
| GB | 2289140 A | 11/1995 |
| GB | 2450848 A | 1/2009 |

* cited by examiner

AUTOMATICALLY DEDUCING THE ELECTRICAL CABLING BETWEEN ELECTRICAL DEVICES

CROSS-REFERENCE TO RELATED APPLICATIONS

This application is a U.S. national stage application under 35 U.S.C. § 371 of International Application No. PCT/EP2016/052590, filed on Feb. 8, 2016, and claims benefit to British Patent Application No. 1 502 284.1, filed on Feb. 11, 2015. The International application was published in English on Aug. 18, 2016, as WO 2016/128338 A2 under PCT Article 21(2).

FIELD

The invention relates to automatically deducing the electrical cabling between electrical devices, particularly the cabling between a primary power source and endpoints in datacenters.

BACKGROUND

In datacenters with racks having many electrical devices, the electrical cabling topology comprising links between the primary power source, for example an Uninterruptible Power Supply (UPS) or Power Distribution Unit (PDU), and end-points like servers, their Power Supply Units (PSU) or network switches is difficult and expensive to construct and to maintain. This is primarily due to the usually large amount of cables accumulated behind racks. Cables are often similar, for example having the same color, the same section, etc. Thus, it is difficult for technicians to differentiate the cables.

Technicians can verify links behind a rack manually for example by noting the chosen plug identifier (something like the PDU name and outlet number), by following the electrical cable, starting from the previously chosen outlet to its other side, which can, however, be difficult due to number of cables and knots, and cable sizes, or by noting the power consumer at the other side of the cable. Solutions to make the cabling easier are known in the art: U.S. Pat. No. 5,666,453 relates to a fiber optic jumper cables and a tracing method using the same. U.S. Pat. No. 6,906,505B2 and the European patent EP2083487B1 describe methods and devices for visually identifying cables by means of light signals transmitted via optical fibers disposed on a cable and extending from a first end to a second end of the cable.

SUMMARY

An aspect of the invention provides a plug adapter configured for application with a system for automatically deducing the electrical cabling between electrical devices, the plug adapter comprising: a plug configured to plug into in a socket of an electrical device; a socket configured to plug into a plug of an electrical cable; a light receiver positioned to receive light emitted by an optical fiber ending in the plug of the electrical cable, which is plugged in the socket and/or a light emitter positioned in order to couple emitted light into an optical fiber ending in the plug of the electrical cable, which is plugged in the socket; and an electronic unit configured to control the light receiver and/or the light emitter and including an interface configured to communicate with a cabling management system of the system configured to automatically deduce the electrical cabling between electrical devices in order to receive control signals for the light emitter and to transmit detection signals from the light receiver.

BRIEF DESCRIPTION OF DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
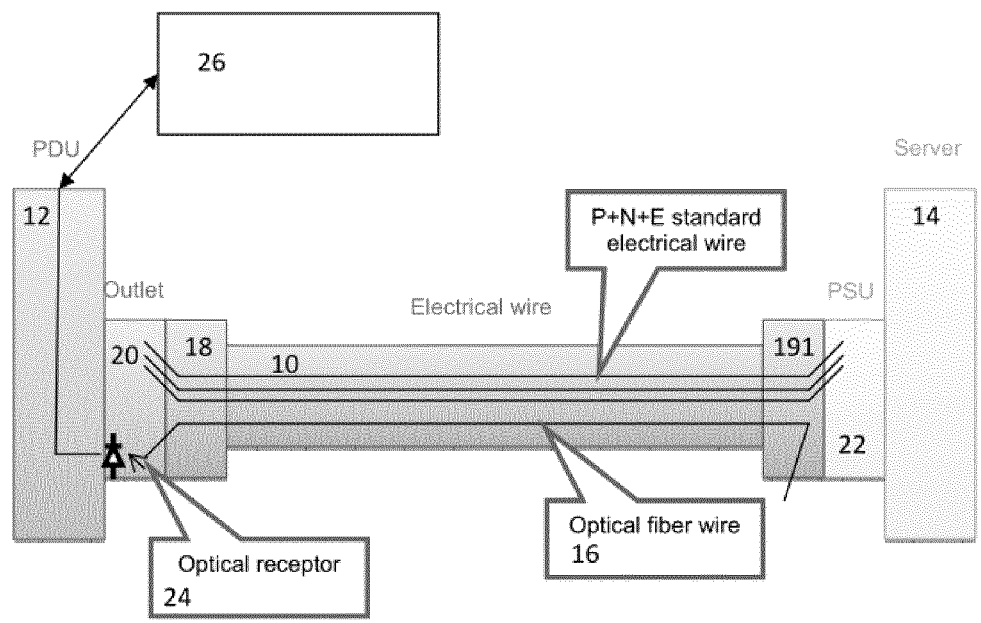
FIG. 1 a first embodiment of the system according to the invention.

The present invention provides a technical solution, which makes it further easier for technicians to verify the electrical cabling between electrical devices.

The present invention provides light receivers in sockets in order to identify electrical cables equipped with an optical fiber for transmitting light and to further provide a cabling management system for automating the deduction of the electrical cabling between electrical devices based on a monitoring of the light receivers. Thus, the predominant manual verification process of the electrical cabling particularly of power cabling in datacenters with lots of UPSs, PDUs, and PSUs can be further automated, which can make it easier for a technician to verify the cabling.

An embodiment of the invention relates to a system for automatically deducing the electrical cabling between electrical devices, comprising at least one electrical cable for connecting at least two electrical devices, wherein the electrical cable comprises an optical fiber extending along at least a part of the electrical cable and at least one end of the optical fiber ending in a plug of the cable, sockets of the electrical devices for the electrical cables, wherein at least one socket comprises a light receiver being provided for receiving light transmitted via the optical fiber and emitted through the end of the optical fiber ending in the plug of the electrical cable being plugged in the socket, and a cabling management system configured to monitor the state of the light receivers of the plugs and to deduce the electrical cabling between the electrical devices from the monitored states. Monitoring the state of a light receiver can mean simply monitoring the presence or absence of light, but also a light color (light frequency) detection, a detection of a light blinking (blinking frequency or pattern), or a light intensity detection or a combination of them.

The cabling management system may be configured to select one of the electrical devices having a socket with a light receiver in response to an input and to start monitoring of the light receiver and to deduce the electrical cabling with another electrical device if the monitored light receivers detects light.

A light emitter may be integrated in a socket of an electrical device and/or in a plug of an electrical cable comprising an optical fiber.

The cabling management device may be configured to control the light emitters of sockets of electrical devices and/or plugs of electrical cables.

The cabling management system may be also configured to select one or more of the electrical devices and/or electrical cables having one or more sockets or plugs with light emitters and to start monitoring of the light receivers of the sockets of the selected electrical devices for deducing the cabling between the electrical devices.

The cabling management system may be further configured to automatically deduce the electrical cabling between devices by switching a light emitter of a socket of an electrical device and/or plug of an electrical cable on and determining a light receiver of a socket, which receives the light emitted by the switched on light emitter.

The cabling management system may be yet further configured to switch a plurality of light emitters one by one on so that only one light emitter is switched on at a certain time and determining the one among the light receivers of sockets, which receives a light.

The light receivers can be integrated in sockets of electrical devices. The light emitters can be integrated in sockets of electrical devices and/or plugs of electrical cables.

A further embodiment of the invention relates to an electrical cable configured for application with a system of the invention and as described herein, wherein the electrical cable comprises plugs on both ends of the cable, one or more electrical wires extending from one plug to the other plug of the cable and being connected to pins of the plugs, an optical fiber extending along at least a part of the electrical cable with at least one end of the optical fiber ending in one of the plugs of the cable, wherein the at least one end of the optical fiber is positioned in the socket to match with a light receiver provided in a plug of an electrical device connected with the plug of the electrical cable.

The electrical cable may further comprise a light emitter being positioned to couple emitted light into an end of the optical fiber and being powered via a power supply connector of the electrical cable.

A yet further embodiment of the invention relates to a plug adapter configured for application with the system of the invention and as described herein and comprising a plug for plugging in a socket of an electrical device, a socket for plugging in a plug of an electrical cable of the invention and as described herein, a light receiver positioned in order to receive light emitted by an optical fiber ending in a plug of the electrical cable, which is plugged in the socket and/or a light emitter positioned in order to couple emitted light into an optical fiber ending in a plug of the electrical cable, which is plugged in the socket, and an electronic unit for controlling the light receiver and/or the light emitter and comprising an interface for communicating with a cabling management system of the system of the invention and as described herein in order to receive control signals for the light emitter and to transmit detection signals from the light receiver.

These and other aspects of the invention will be apparent from and elucidated with reference to the embodiments described hereinafter.

The invention will be described in more detail hereinafter with reference to exemplary embodiments. However, the invention is not limited to these exemplary embodiments.

In the following, functionally similar or identical elements may have the same reference numerals. Absolute values are shown below by way of example only and should not be construed as limiting the invention.

FIG. 1 shows an electrical power supply cable 10 connecting a PDU 12 with a server 14. The cable 10 comprises besides electrical wires for the power supply of the PSU of the server 14 an optical fiber 16 extending along the entire length of the electrical cable 10 from one end to the other end of the cable 10. The optical fiber 16 can be for example placed between phases and neutral electrical sub-wires of the cable.

The ends of the optical fiber 16 are positioned in each plug 18 and 191 of the cable 10 differently: the end of the optical fiber 16 in the plug 18, which is plugged in an outlet socket 20 of the PDU 12 is positioned so that light emitted by the end of the optical fiber 16 is coupled into a light receiver 24, for example a photodiode, integrated in the outlet socket 20. In the other plug 191, which is plugged in the inlet socket 22 of the PSU of the server 14, the end of the optical fiber 16 stands out of the cable 10 in order to allow coupling light from a light source into the optical fiber 16.

On the PDU side, the light receiver 24 is connected to infrastructure interfaces like management cards of the PDU, particularly to a cabling management system 26, which monitors the state of the light receiver 24 in order to deduce a cabling between the PDU 12 and the server 14. The cabling management system 26 can be implemented by a computer executing software like power management software for monitoring and managing the PDU 12. The cabling management device 26 can detect all electrical devices to be cabled with electrical cables, particularly PDUs, USPs, and PSUs, and manage the detected devices, particularly deduce their cabling.

Figure 2:
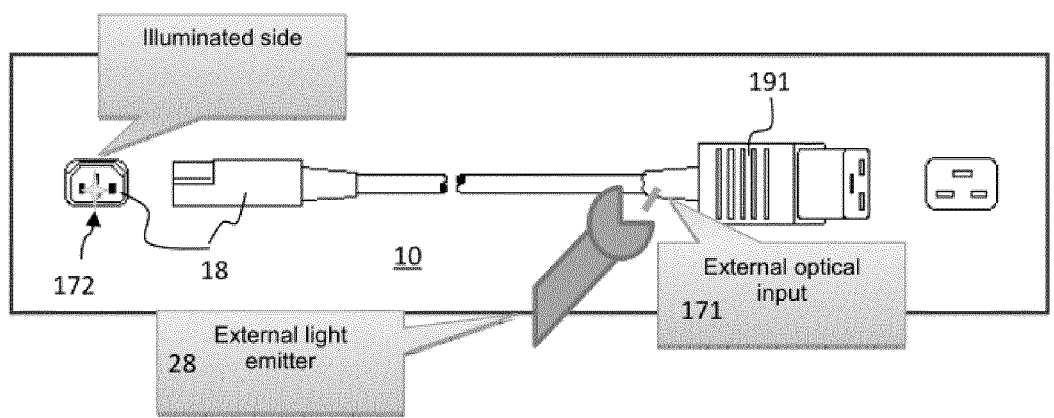
FIG. 2 a first embodiment of an electrical power supply cable according to the invention.

FIG. 2 shows an electrical power supply cable 10 for connecting the PDU 12 with the PSU of the server 14 with the optical fiber. An external optical input 171 is formed by one end of the optical fiber, which stands out of the electrical cable 10 for coupling light from an external light emitter 28 into the optical fiber. The other end of the optical fiber is positioned in a first plug 18 of the cable, which is configured to be plugged in the outlet socket 20 of the PDU 12.

Automatic deducing of the cabling between the PDU 12 and one or more server 14 can be performed as follows: a technician can select a device like the server 14 in the power management software, and plugs a handled external light emitter 28 at the external optical input 171, which is in a cabled configuration at the side of the power consumer, namely the server 14. The power management software monitors the light receiver 24 contained in the outlet socket 20 of the PDU 12, and can in this way determine whether the server 14 is correctly cabled with the PDU 12 if the light receiver 24 detects an illumination of the end 172 of the optical fiber 16.

Figure 3:
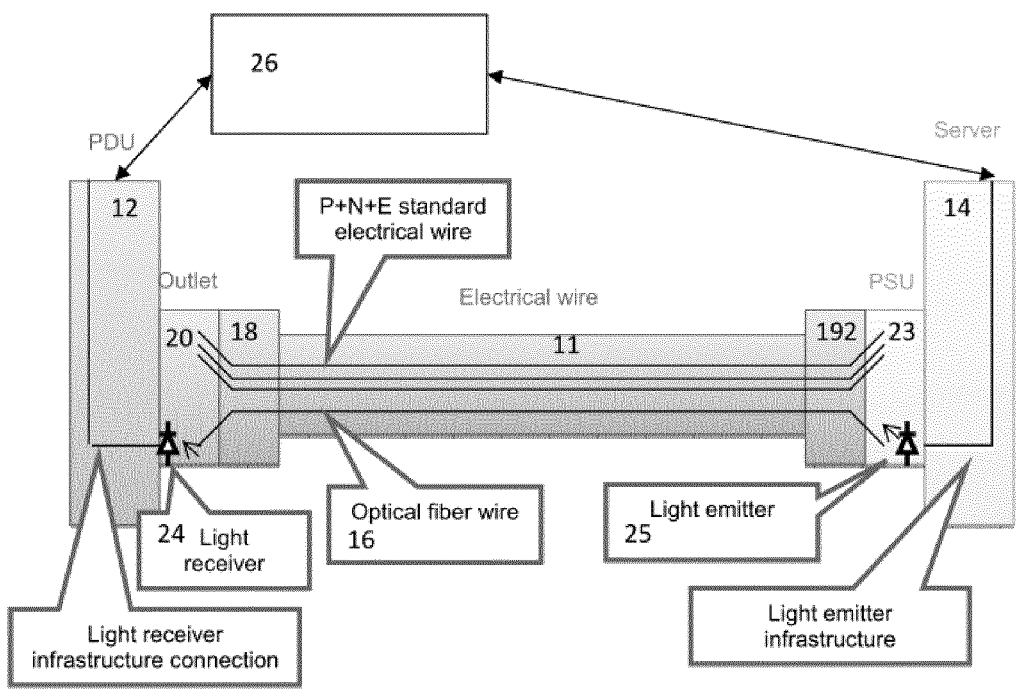
FIG. 3 a second embodiment of the system according to the invention.
Figure 4:
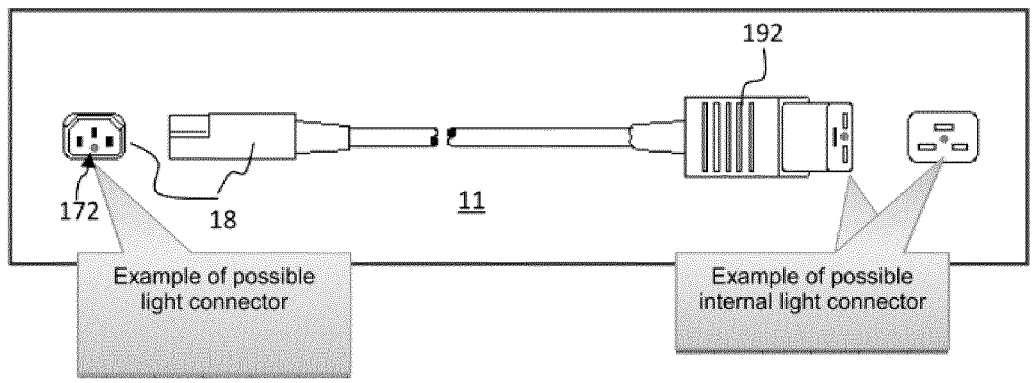
FIG. 4 a second embodiment of an electrical power supply cable according to the invention.

FIG. 3 shows another embodiment of the system for automatically deducing the electrical cabling between electrical devices. This system differs from the one shown in FIG. 1 in that an electrical cable 11 is used, in which both ends of the optical fiber 16 are positioned in the plugs 18 and 192, respectively. An implementation of such an electrical cable 11 is shown in FIG. 4. Light emitted from a light emitter 25, which is integrated in the inlet socket 23 of the PSU of the server 14, is coupled into the optical fiber when the plug 192 is plugged in the inlet socket 23. The light emitter 25, for example a LED, is electrically connected to a light emitter infrastructure, which can be connected with the cabling management system 26 for controlling the light emitters of sockets.

The cabling management system, particularly the power management software can automatically and cyclically deduce the electrical cabling between PDUs, UPSs, and PSUs as described in the following: the power management software will switch-off all light emission from light emitters 25 (on the power consumer side), and then switch-on one (and only one) of the light emitters 25; the software then looks at which outlet light receiver 24 (on power provider or supplier side) "sees" a light (transmitted via the optical fiber integrated in the electrical cable 11). If a light (and only one) is seen, the software can consider the respective power source and the power consumer as paired, namely the server 14, to which the switched on light emitter 25 is assigned, and the outlet socket 20 of the PDU 12, the light receiver 24 of which has detected light. This can be done cyclically while not all devices have been paired (and can be done after to be sure the pairing is always correct). Especially in case of many electrical cables, the power management software can in an entirely automatic process deduce which PSU is electrically cabled with which outlet socket 20 of a PDU 12 or with which PDU 12, if more than one PDUs are used.

According to a further embodiment of the invention, the light emitters 25 can also be integrated in the plug 192 of the electrical cable 11 instead of being integrated in the inlet socket 23. Such a cable integrated light emitter can be controlled via a dedicated power supply connector of the electrical cable. Thus, the system of FIG. 3 can also be applied to server 14 having a PSU with a standard plug inlet without an integrated light emitter.

Figure 5:
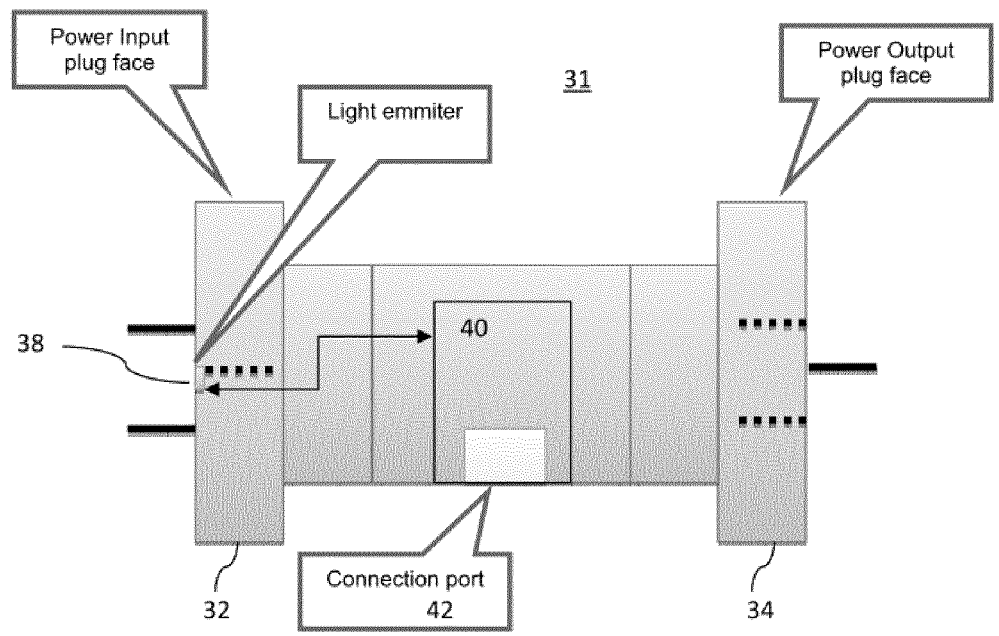
FIG. 5-6 two embodiments of plug adapters according to the invention.
Figure 6:
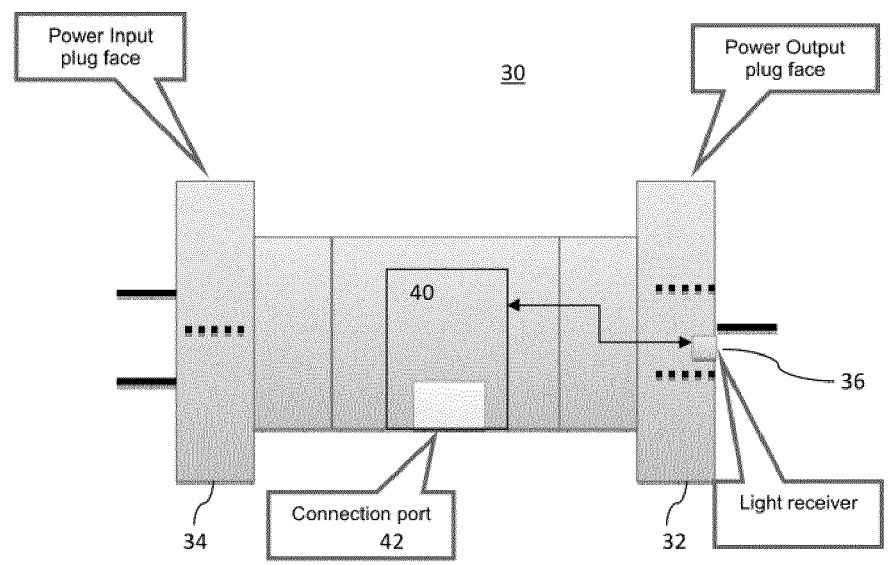

FIGS. 5 and 6 show plug adapters 30, 31 for implementing the inventive technology with electrical devices having standard inlet or outlet sockets, i.e. sockets without integrated light emitters and/or receivers.

The plug adapter 30 shown in FIG. 6 comprises a socket 32 and a plug 34, both comprising pins which are electrically connected so that pins of the socket 32 are electrically connected to corresponding pins of the plug 34 looping electrical current flowing in pins of the plug through to a corresponding pin of the socket and vice versa.

The plug 34 is adapted to be plugged in a complementary standard inlet or outlet socket. The socket 32 is adapted to receive a plug of an electrical cable with an integrated optical fiber and comprises a light receiver 36. Light receiver 36 is electrically connected with an electronic unit 40, which controls the supply of the light receiver 36 and receives a light detection signal from the light receiver 36.

The electronic unit 40 further comprises an interface 42, which can comprise a connection port for a control cable from a cabling management system 26. Via the interface 42, a light detection signal generated by the light receiver 36 can be transmitted to the cabling management system 26. The connection port of the interface 42 can be for example an USB (Universal Serial Bus) or an Ethernet connector.

The plug adapter 31 shown in FIG. 5 also comprises a socket 32 and a plug 34, both comprising pins which are electrically connected so that pins of the socket 32 are electrically connected to corresponding pins of the plug 34 looping electrical current flowing in pins of the plug through to a corresponding pin of the socket and vice versa.

The plug 34 is adapted to be plugged in a complementary standard inlet or outlet socket. The socket 32 is adapted to receive a plug of an electrical cable with an integrated optical fiber and comprises a light emitter 38. Light emitter 38 is electrically connected with an electronic unit 40, which controls the switching on and off of the light emitter 38.

The electronic unit 40 further comprises an interface 42, which can comprise a connection port for a control cable from a cabling management system 26. Via the interface 42, control signals or commands can be received from the cabling management system 26. The connection port of the interface 42 can be for example an USB (Universal Serial Bus) or an Ethernet connector.

It should be noted that the functionality of both adapters 30 and 31 can also be integrated in an universal adapter with an integrated light emitter and receiver and with an electronic unit being configured to control light emission as well as light detection via the light emitter and receiver, The function of the adapter (light emitter/receiver) can be configured for example by the cabling management system 26 electronically via the communication port 42 and/or manually, for example by means of a switch at the adapter.

Figure 7:
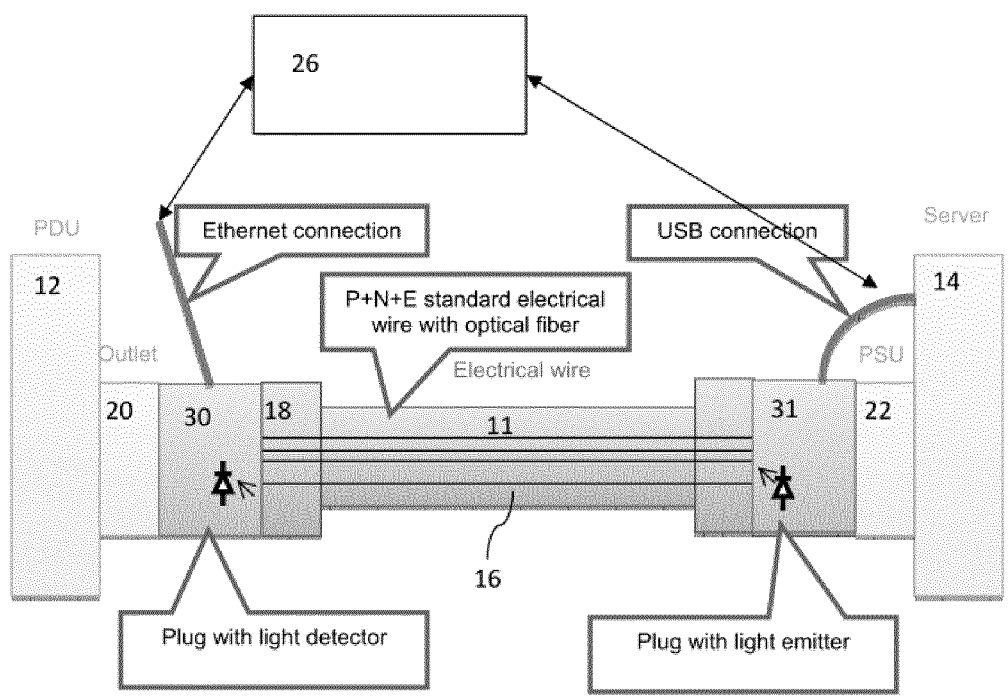
FIG. 7 a third embodiment of the system according to the invention.

FIG. 7 shows the application of the two different types of the plug adapter 30 and 31 with a system for automatically deducing the electrical cabling between electrical devices according to the invention. The system is similar to the systems from FIGS. 1 and 3, but differs in that the PDU 12 and the PSU of the server 14 have standard sockets without integrated light receivers and/or emitters.

This functionality can be upgraded by using a first plug adapter 30 with an integrated light receiver and a second plug adapter 31 with an integrated light emitter. The first plug adapter 30 is plugged with its plug 32 in the outlet socket 20 of the PDU 12. The second plug adapter 31 is plugged with its plug in the inlet socket 22 of the PSU of the server 14. An electrical cable 11 with an optical fiber 16 is plugged in the sockets 34 of both plug adapters thus electrical connecting the respective pins of the outlet and the inlet plugs via the electrical wires of the cable 11.

A cabling management system 26 is connected via an Ethernet connection to the interface of the electronic unit of the first plug adapter for monitoring the state of the light receiver contained in the first plug adapter 30. The interface of the electronic unit of the second plug adapter can be connected via a USB cable to a USB interface of the server 14 and/or to a USB interface of the cabling management system 26. Another possibility is to connect the first plug adapter 30 to the PDU 12 through a point to point connection (USB, serial, dry contact, etc.) and the PDU 12 is connected to the cabling management system 26 through an Ethernet connection. The system 26 can now deduce the cabling between the PDU 12 and the server as described above with regard to the system shown in FIG. 3.

The present invention is particularly suitable for application in datacenters in order to automate the discovery and maintaining of power links (power topology) and can help technicians to save time required for cabling.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a"

or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

REFERENCE NUMERALS AND ABBREVIATIONS 10 electrical cable
11 electrical cable
12 PDU
14 Server
16 optical fiber
171 external optical input of the optical fiber 16
172 optical output of the optical fiber 16
18 first plug of the electrical cable 10, 11
191 second plug of the electrical cable 10
192 second plug of the electrical cable 11
20 outlet socket of the PDU 12
22 inlet socket of the PSU of the server 14
24 light receiver/optical receptor
25 light emitter/LED
26 cabling management system
28 external light emitter
30 plug device
31 plug device
32 socket/power input plug face
34 plug/power output plug face
36 light receiver
38 light emitter
40 electronic unit
42 interface
PDU Power Distribution Unit
PSU Power Supply Unit
UPS Uninterruptible Power Supply
USB Universal Serial Bus

The invention claimed is:

1. A plug adapter configured for application with a system for automatically deducing electrical cabling between at least a first electrical device having an electrical device socket and a second electrical device, the first and second electrical devices being connectable by an electrical cable having an electrical cable plug and an optical fiber ending in the electrical cable plug, the system including a cabling management system, the plug adapter comprising:
 a plug adapter plug configured to be inserted into in the electrical device socket;
 a plug adapter socket configured to receive the electrical cable plug;
 a light receiver positioned to receive light emitted by the optical fiber when the electrical cable is inserted into the plug adapter socket, and/or a light emitter positioned in order to couple emitted light into the optical fiber when the electrical cable is inserted into the plug adapter socket; and
 an electronic unit configured to control the light receiver and/or the light emitter, the electronic unit including an interface configured to communicate with the cabling management system by being configured to receive control signals for the light emitter and/or to transmit detection signals from the light receiver,
 wherein the plug adapter is configured to be disposed between the electrical device socket and the electrical cable plug.

2. A system for automatically deducing electrical cabling between a plurality of electrical devices, the system comprising:
 at least one an electrical cable configured to connect at least a first and a second electrical device of the plurality of electrical devices, the at least one electrical cable including an optical fiber extending along at least a part of the electrical cable and at least one end of the optical fiber ending in a first electrical cable plug;
 each of the plurality of electrical devices including at least one electrical device socket, each at least one electrical device socket being configured to receive the at least one electrical cable, at least one of the at least one electrical device sockets including a light receiver configured to receive light transmitted via the optical fiber and emitted through the at least one end of the optical fiber when the at least one electrical cable is inserted into the at least one of the at least one electrical device sockets;
 each of the plurality of electrical devices including at least one plug adapter, the at least one plug adapter comprising a plug adapter plug inserted into the at least one electrical device socket of a respective electrical device and a plug adapter socket into which the at least one electrical cable is pluggable; and
 a cabling management system configured to monitor states of the light receiver and to deduce the electrical cabling between two of the plurality of electrical devices that are connected to the at least one electrical cable based on the states,
 wherein the at least one plug adapter is configured to be disposed between the electrical device socket of the respective electrical device and the first electrical cable plug.

3. The system of claim 2, wherein the cabling management system is configured to select the electrical device that includes the at least one electrical socket including the light receiver in response to an input and to start monitoring of the light receiver to deduce electrical cabling between such electrical device and a second electrical device of the plurality of electrical devices if the light receiver detects light.

4. The system of claim 2, wherein the at least one electrical device socket of at least one electrical device of the plurality of electrical devices includes a light emitter.

5. The system of claim 2, wherein the first electrical cable plug of the electrical cable includes a light emitter.

6. The system of claim 4, wherein the cabling management system is configured to control the light emitter.

7. The system of claim 5, wherein the at least one electrical cable comprises a plurality of electrical cables, and wherein the cabling management system is configured to select one or more of the plurality of electrical devices having light emitters and/or one or more of the plurality of electrical cables having light emitters and to start monitoring of light receivers to deduce cabling between the plurality of electrical devices.

8. The system of claim 7, wherein the cabling management system is configured to automatically deduce electrical cabling between the plurality of electrical devices by switching on a light emitter of an at least one electrical device socket and/or an electrical cable plug and determining which light receiver receives light emitted by the switched-on light emitter.

9. The system of claim 8, wherein the cabling management system is configured to switch on a plurality of light emitters one by one so that only one light emitter is switched on at a certain time and to determine which light receiver receives light.

10. The system of claim 2, wherein each at least one electrical device socket of each of the plurality of electrical devices includes a light receiver, and/or
   wherein the at least one electrical cable comprises a plurality of electrical cables, and each at least one electrical device socket of each of the plurality of electrical devices, and/or at least one electrical cable plug of each electrical cable of the plurality of electrical cables includes a light emitter.

* * * * *